T. H. SPARKS.
DEVICE FOR AUTOMATICALLY LIFTING AND SUPPORTING AUTOMOBILES AND OTHER VEHICLES.
APPLICATION FILED JULY 3, 1913.
1,081,165.
Patented Dec. 9, 1913.
2 SHEETS—SHEET 1.
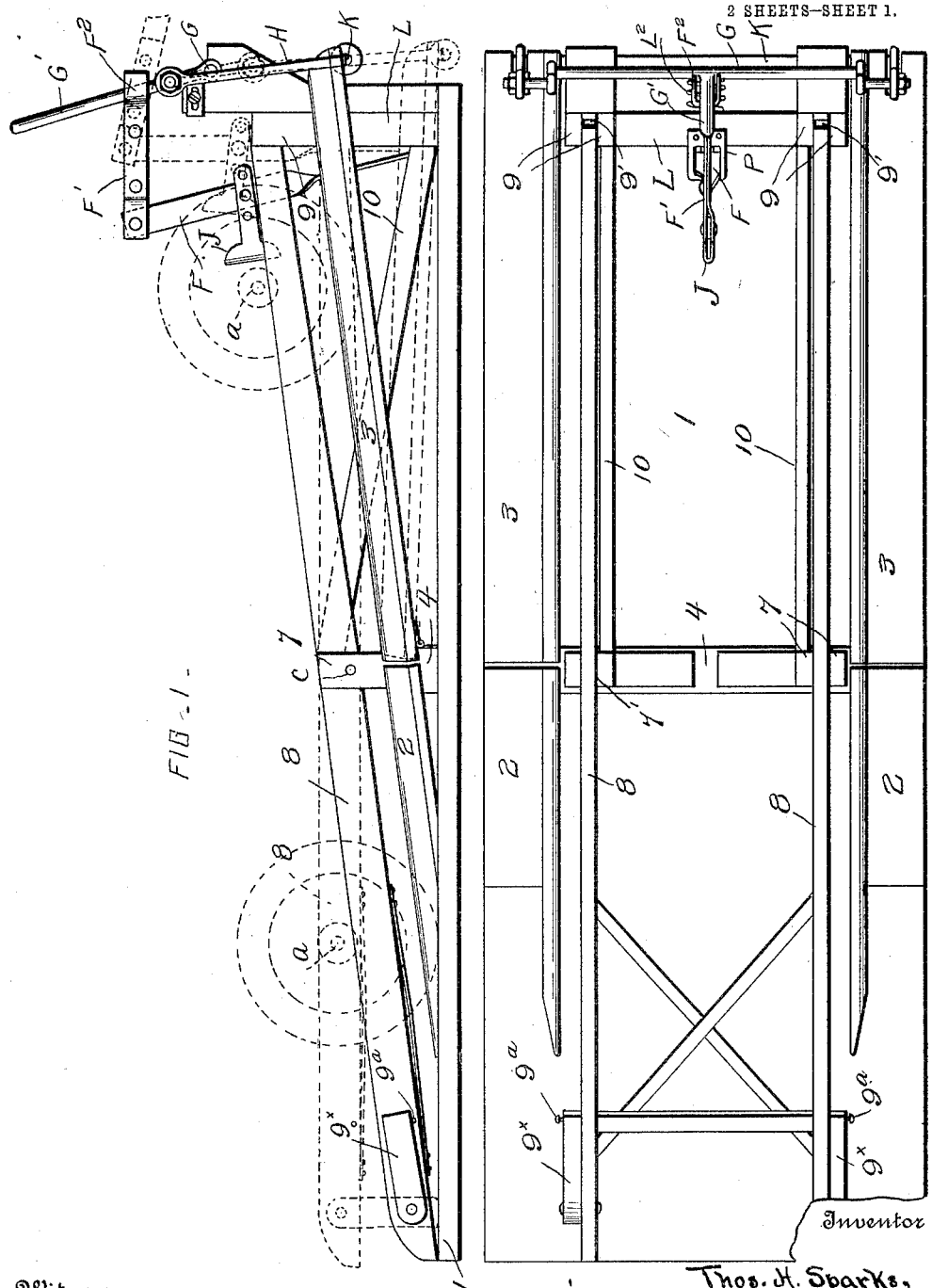

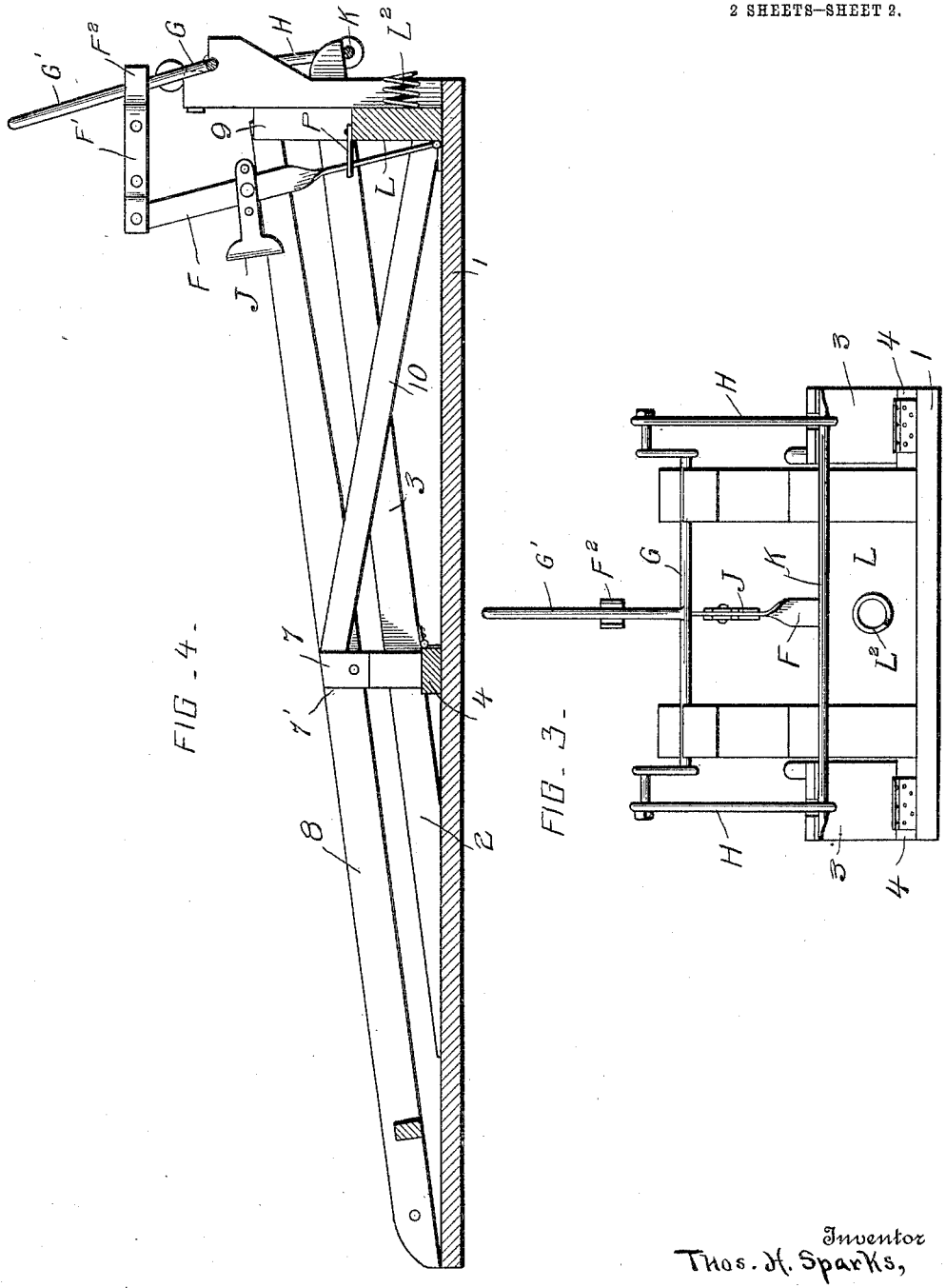

UNITED STATES PATENT OFFICE.

THOMAS H. SPARKS, OF WICHITA, KANSAS.

DEVICE FOR AUTOMATICALLY LIFTING AND SUPPORTING AUTOMOBILES AND OTHER VEHICLES.

1,081,165.  Specification of Letters Patent.  Patented Dec. 9, 1913.

Application filed July 3, 1913. Serial No. 777,363.

*To all whom it may concern:*

Be it known that I, THOMAS H. SPARKS, a citizen of the United States, residing at Wichita, in the county of Sedgwick and State of Kansas, have invented certain new and useful Improvements in Devices for Automatically Lifting and Supporting Automobiles and other Vehicles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in devices for use in raising automobiles and other vehicles and it has for its object the provision of a simple, inexpensive and practical device of this character in which the vehicle is moved upward over inclined ways or tracks a sufficient distance above a horizontal plane as to permit the wheels to be freely rotated or removed from the axle, if desired, for the purpose of repair, and in the provision of means whereby the inclined tracks will be automatically dropped from beneath the wheels when the vehicle reaches its proper position, the weight of the vehicle being suspended upon horizontal timbers or supports beneath the axles.

An essential object of the invention resides in the provision of means whereby the weight of an automobile or other vehicle provided with pneumatic tires may be automatically transferred from the wheels to supporting timbers beneath the axles, thereby relieving the tires from the necessity of supporting the vehicle while the same is in the garage.

To these ends and to such others as the invention may pertain, the same consists in the novel construction, peculiar arrangement, combination and adaptation of parts, all as will be more fully hereinafter described, shown in the accompanying drawings and then specifically defined in the appended claims.

The invention is clearly illustrated in the accompanying drawings which, with the reference characters marked thereon, form a part of this specification and in which:—

Figure 1 is a side elevation of a device constructed in accordance with my invention. Fig. 2 is a top plan view of the same. Fig. 3 is an end view, and Fig. 4 is a vertical longitudinal section of the device.

Reference now being had to the details of the drawings, 1 represents the platform or floor, and 2, 2 are short inclined tracks secured to the platform at the opposite edges thereof, said tracks being inclined upward at a slight angle adjacent to one end of the platform.

3, 3 are tracks having hinged connection at their rear ends with the transverse timbers 4 and at their forward ends pivotally connected with a transverse rod K, which rod is journaled at its ends within the lower ends of the links H, the upper ends of which links are provided with journals for the outer ends of the crank lever G.

8, 8 are two parallel timbers disposed between the tracks 3, 3 upon opposite sides of the platform, said timbers being pivoted at substantially their longitudinal centers upon the pins provided in posts or standards 7 rising from the cross timber 4, while at their forward ends said beams or timbers 8 are vertically movable within slots 9′ provided in the uprights 9 and at their opposite ends the said timbers are provided with pivoted supports or legs $9^x$, which supports are adapted, when not in use, to be folded back against the upper faces of the stops or pins $9^a$ projecting from the side faces of the timbers.

10, 10 are inclined bracing timbers connecting the base portion L with the uprights 7.

F is a standard having pivotal connection at its lower end with the inner face of the base portion L and its free upper end being pivotally connected with a short lateral arm or lever F′, said lever being provided with an open U or hook-shaped portion $F^2$ to receive the centrally disposed member G of the crank arm when the same is thrown upward. A keeper P upon the base portion L serves to limit the movement of the said standard F, as will be readily understood.

J is a bumper secured to and carried by the pivoted standard and extending rearwardly therefrom.

To operate the device, the crank lever G is raised a trifle past the vertical or upright position, thus allowing the cranks to pass the center far enough to insure the lever falling forward by gravity and, when in this position, the crank lever G will be received between prongs $f$ of the hook carried by the forward end of the link F². A spring bumper L² is provided to compensate for the blow imparted to the device by downward movement of the arm G′ of the crank lever. It will be noted that, when the lever G is pushed back over the center, this movement will serve to unlock the pivoted track and permit the same to fall, thus leaving the machine supported upon the beams 8, 8 with the axles resting thereon. The axles at $a$, $a$ being farther removed from the fulcrum C, the machine raises itself automatically because of this unbalanced position. To remove the machine, it is simply necessary to turn the rear supports, raise the trip F′ and turn the wheels on the trip lever E which will allow the lever G to return to its normal position, which serves to throw the weight of the machine again upon its wheels. After removing the vehicle, the trip is turned downward so as to engage the lever G. The rear ends of the beams 8 being free automatically adjust themselves to the receiving position.

Having thus described my invention, what I claim to be new is:—

1. In combination with pivoted vehicle supporting timbers, inclined tracks, bell crank lever mechanism connected with the tracks, a trip lever pivotally connected with the bell crank lever, a bumper carried by the trip lever and adapted, by contact with the vehicle, to automatically lower the tracks and transfer the weight of the vehicle to the vehicle supporting timbers, substantially as shown and described.

2. In a device of the character described, in combination with pivoted vehicle supporting timbers, pivoted tracks, fixed inclined tracks upon opposite sides of said timbers, track sections having hinge connection at their rear ends with the fixed tracks and at their opposite ends connected to a crank lever, a trip lever pivoted at its lower end to the support of the crank lever, a tripping arm pivotally connected at one end with the upper end of the said lever and its opposite end provided with a U-shaped hook or keeper to receive the arm of the crank lever when elevated, and a bumper connected with the trip lever, substantially as shown and described.

In testimony whereof I hereunto affix my signature in presence of two witnesses.

THOMAS H. SPARKS.

Witnesses:
E. E. BLECTLEY,
WM. CARTER.

---

Copies of this patent may be obtained for five cents each, by addressing the "Commissioner of Patents, Washington, D. C."